United States Patent
Wakita

(10) Patent No.: US 10,323,978 B2
(45) Date of Patent: Jun. 18, 2019

(54) VIBRATION VISUALIZATION ELEMENT INCLUDING OPTICAL MEMBER

(71) Applicant: Panasonic Intellectual Property Management Co., Ltd., Osaka (JP)

(72) Inventor: Naohide Wakita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 15/659,095

(22) Filed: Jul. 25, 2017

(65) Prior Publication Data

US 2017/0322072 A1 Nov. 9, 2017

Related U.S. Application Data

(63) Continuation of application No. PCT/JP2016/001288, filed on Mar. 9, 2016.

(30) Foreign Application Priority Data

Apr. 20, 2015 (JP) ................................ 2015-086141

(51) Int. Cl.
*G01M 5/00* (2006.01)
*G01M 7/02* (2006.01)
*G01H 9/00* (2006.01)

(52) U.S. Cl.
CPC ............ *G01H 9/00* (2013.01); *G01M 5/0091* (2013.01); *G01M 7/025* (2013.01)

(58) Field of Classification Search
CPC ....... G01H 9/00; G01M 5/0091; G01M 7/025
(Continued)

(56) References Cited

U.S. PATENT DOCUMENTS 5,289,434 A 2/1994 Bemi
5,705,810 A 1/1998 Wang et al.
(Continued)

FOREIGN PATENT DOCUMENTS

DE 19826565 A1 6/1999
JP 10-153701 6/1998
(Continued)

OTHER PUBLICATIONS

The Extended European Search Report dated Mar. 21, 2018 for the related European Patent Application No. 16782753.4.
(Continued)

*Primary Examiner* — Jacques M Saint Surin
(74) *Attorney, Agent, or Firm* — McDermott Will & Emery LLP

(57) ABSTRACT

A vibration visualization element includes an optical member that retroreflects light or electromagnetic wave. The optical member includes: a fixed section, relative positional relationship of which with respect to a measurement object is fixed; and a movable section movably supported by the fixed section to allow relative positional relationship with the fixed section to be changed by application of an acceleration to the fixed section in a predetermined direction. The fixed section and the movable section are configured such that, according to the change in the relative positional relationship between the fixed section and the movable section, a reflection direction of the light or the electromagnetic wave is changed to change a luminance of reflected light in a retroreflection direction or an amount of reflected electromagnetic wave in the retroreflection direction.

18 Claims, 11 Drawing Sheets

(58) Field of Classification Search
USPC .......................................................... 73/653
See application file for complete search history.

(56) References Cited

U.S. PATENT DOCUMENTS

| | | | |
|---|---|---|---|
| 5,956,355 A * | 9/1999 | Swanson | A61B 1/00183 356/479 |
| 6,160,826 A * | 12/2000 | Swanson | A61B 1/00183 372/102 |
| 6,221,496 B1 | 4/2001 | Mori | |
| 7,101,053 B2 * | 9/2006 | Parker | G01S 7/481 250/221 |
| 8,405,636 B2 * | 3/2013 | Bridger | G06F 3/0421 250/216 |
| 2009/0161217 A1 | 6/2009 | Mimura | |
| 2017/0356792 A1 * | 12/2017 | Wakita | G01H 9/00 |
| 2018/0058841 A1 * | 3/2018 | Wakita | G06T 7/74 |

FOREIGN PATENT DOCUMENTS

| | | |
|---|---|---|
| JP | 2000-266593 | 9/2000 |
| JP | 2008-281422 | 11/2008 |
| JP | 2010-045730 | 2/2010 |
| JP | 2012-103009 | 5/2012 |
| WO | 2007/064033 | 6/2007 |
| WO | 2015/012094 | 1/2015 |

OTHER PUBLICATIONS

International Search Report of PCT application No. PCT/JP2016/001288 dated May 31, 2016.
Kohei Makino et al., "Structural Identification of Existing Bridges by Vibration Measurements Using Laser Doppler Velocimeter", Journal of the Japanese Society for Experimental Mechanics, vol. 11, No. 3, pp. 201-208, Sep. 2011.

* cited by examiner

VIBRATION VISUALIZATION ELEMENT INCLUDING OPTICAL MEMBER

BACKGROUND

1. Technical Field

The present disclosure relates to a vibration visualization element to be attached to a measurement object, a vibration measurement system using the vibration visualization element and a vibration measurement method.

2. Description of the Related Art

In Japan, many of public structures such as a bridge or a tunnel were built in the high-growth period of the 1970s. In general, it is said that the lifespan of these structures is 50 years after construction. For this reason, it is expected that the number of structures that have exceeded the lifespan rapidly increases in the near future. Accordingly, demand for inspection and reinforcement of these structures is rapidly increasing.

In general, it is known that the stiffness and the natural frequency of a structure have a correlation. Inspection of deterioration of a structure by measuring a change in the natural frequency of the structure utilizing this relationship has been conducted conventionally.

For instance, Experiment Mechanics, Vol. 11, No. 3, pp 201-208 (September, 2011), "Structural Identification of Existing Bridges Using Laser Doppler Velocimeter", Kouhei Makino, Hiroshi Matsuda, Chihiro Morita, Kazuo Ichimiya, describes a method of inspecting a structure for deterioration, in which vibration of a bridge is measured using a laser Doppler velocimeter, and the rate of change in the natural frequency is checked before and after the bridge is reinforced.

In the University of Illinois in the U.S., a system has been researched and developed in which a great number of wireless sensor nodes each including an acceleration sensor, a CPU, and a wireless unit is attached to a measurement object, and vibration is analyzed based on data sent from the wireless sensor nodes (Illinois Structural Health Monitoring Project).

SUMMARY

One non-limiting and exemplary embodiment provides a vibration visualization element that visualizes vibration applied to a measurement object.

In one general aspect, the techniques disclosed here feature a vibration visualization element including an optical member that retroreflects light or electromagnetic wave. The optical member includes: a fixed section, relative positional relationship of which with respect to a measurement object is fixed; and a movable section movably supported by the fixed section to allow relative positional relationship with the fixed section to be changed by application of an acceleration to the fixed section in a predetermined direction. The fixed section and the movable section are configured such that, according to the change in the relative positional relationship between the fixed section and the movable section, a reflection direction of the light or the electromagnetic wave is changed to change a luminance of reflected light in a retroreflection direction or an amount of reflected electromagnetic wave in the retroreflection direction.

General or specific aspects of the present disclosure may be implemented as a device, an apparatus, a system, a method, or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
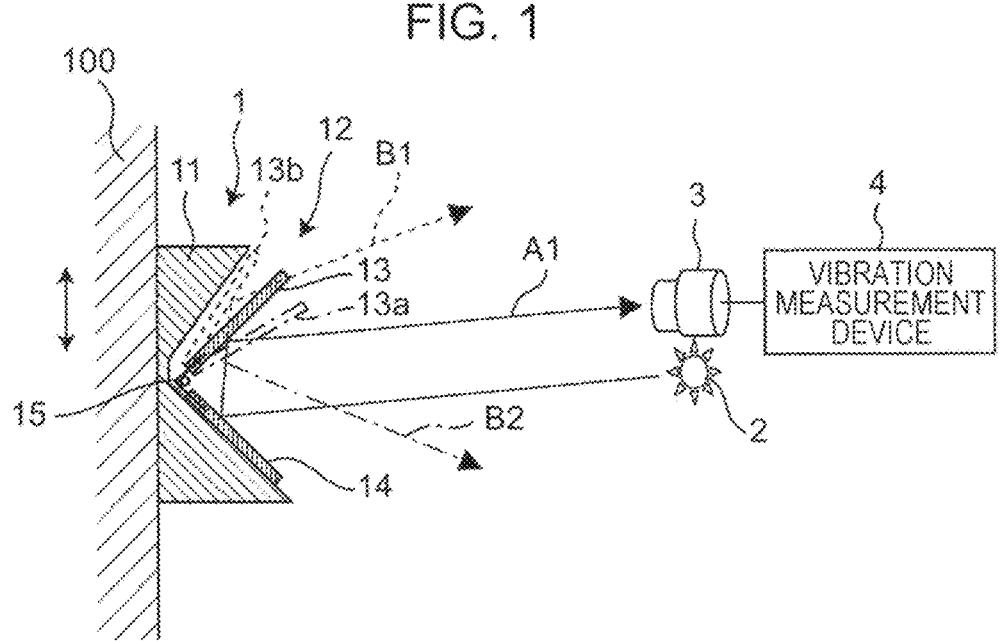
FIG. 1 is a schematic configuration diagram of a vibration measurement system according to a first embodiment of the present disclosure.

DETAILED DESCRIPTION (Underlying Knowledge Forming Basis of the Present Disclosure)

The present disclosure relates to a vibration visualization element that can visualize fine vibration of a measurement object, such as a bridge or a tunnel, and a vibration measurement system and a vibration measurement method using the vibration visualization element.

A laser Doppler velocimeter is a device that utilizes the Doppler effect, irradiates a measurement object with a laser from a measuring instrument and measures a velocity of the laser moving away from the measuring instrument, and a velocity of the laser moving closer to the measuring instrument after being reflected by the measurement object. Thus, with a vibration measurement method using a laser Doppler velocimeter, vibration can be measured at only one spot at a time, and it takes a considerable time to measure the vibration of the entire measurement object.

On the other hand, with a vibration measurement method using wireless sensor nodes, the wireless sensor nodes are distributed over and attached to the entire measurement object, thereby making it possible to measure the vibration of the entire measurement object simultaneously. However, with this vibration measurement method, the power consumption of a CPU or the like is high, and thus it is necessary to replace batteries frequently. Particularly when a measurement object is a large-size structure such as a bridge, it is extremely difficult to frequently replace the batteries of the wireless sensor nodes attached to the large-size structure. For this reason, it is called for to reduce the number of times of maintenance as much as possible.

Thus, the present inventor has intensively studied in order to provide a vibration visualization element, a vibration measurement system and a vibration measurement method using the vibration visualization element that are capable of measuring vibration of the entire measurement object in a shorter time and of reducing the number of times of maintenance. As a result, the present inventor has devised a vibration visualization element, a vibration measurement system and a vibration measurement method using the vibration visualization element that are capable of measuring vibration of the entire measurement object in a shorter time and of reducing the number of times of maintenance.

According to a first aspect of the present disclosure, a vibration visualization element is provided, that is to be attached to a measurement object to visualize vibration applied to the measurement object, the vibration visualization element including one or more optical members that have a retroreflective property for light or electromagnetic wave. The one or more optical members emit reflected light or reflected electromagnetic wave in a retroreflection direction. In each of the one or more optical members, part of the optical member is moved relative to other part of the optical member in accordance with the vibration, so that a luminance of the reflected light emitted in the retroreflection direction or an amount of the reflected electromagnetic wave emitted in the retroreflection direction is changed.

With this configuration, the vibration visualization element can be operated without a power supply.

According to a second aspect of the present disclosure, the vibration visualization element according to the first aspect is provided, which further includes a case and in which each of the one or more optical members includes three mirrors arranged perpendicular to one another, the three mirrors include at least one fixed mirror fixed to the case, and at least one movable mirror that is moved relative to the at least one fixed mirror in accordance with the vibration, and an angle formed by the at least one fixed mirror and the at least one movable mirror is changed according to the vibration, so that the luminance of the reflected light emitted in the retroreflection direction or the amount of the reflected electromagnetic wave emitted in the retroreflection direction is changed.

According to a third aspect of the present disclosure, the vibration visualization element according to the second aspect is provided, in which each of the one or more optical members further includes an elastic member that connects the at least one movable mirror to at least one of the at least one fixed mirror so that the luminance of the reflected light emitted in the retroreflection direction or the amount of the reflected electromagnetic wave emitted in the retroreflection direction oscillates in synchronization with the vibration.

According to a fourth aspect of the present disclosure, the vibration visualization element according to the second or third aspect is provided, in which the one or more optical members are a plurality of optical members, and the optical members are arranged without space.

According to a fifth aspect of the present disclosure, the vibration visualization element according to the first aspect is provided, in which each of the one or more optical members includes a spherical lens, and a concave reflector that is disposed behind the spherical lens and movable independently to the spherical lens, and a relative position between the spherical lens and the concave reflector is moved according to the vibration, so that the luminance of the reflected light emitted in the retroreflection direction or the amount of the reflected electromagnetic wave emitted in the retroreflection direction is changed.

According to a sixth aspect of the present disclosure, the vibration visualization element according to the fifth aspect is provided, which further includes a case, a support member, and an elastic member and in which the one or more optical members are a plurality of optical members, the spherical lens of each of the optical members is supported by the support member, and the support member is attached to the case via the elastic member.

According to a seventh aspect of the present disclosure, the vibration visualization element according to the first aspect is provided, in which each of the one or more optical members includes a corner cube, and a deformation member that allows contact with part of the corner cube. In accordance with the vibration, the deformation member contacts with the part of the corner cube to deform the corner cube, so that the luminance of the reflected light in the retroreflection direction or the amount of the reflected electromagnetic wave in the retroreflection direction is changed.

According to an eighth aspect of the present disclosure, the vibration visualization element according to the first aspect is provided, in which in each of the one or more optical members, an angle formed by the part of the optical member and the other part of the optical member is changed according to the vibration, so that the luminance of the reflected light in the retroreflection direction or the amount of the reflected electromagnetic wave in the retroreflection direction is changed.

A vibration measurement system is provided including: one or more vibration visualization elements according to any one of the first to eighth aspects; a light source that emits the light or the electromagnetic wave to the one or more vibration visualization elements; an imaging device that captures an image including the light or the electromagnetic wave emitted in the retroreflection direction by the one or more optical members of each of the one or more vibration visualization elements; and a vibration measurement device that measures vibration applied to the measurement object, based on the image captured by the imaging device.

According to a 10th aspect of the present disclosure, the vibration measurement system according to the ninth aspect is provided, which further includes first and second color filters with different transmission wavelength bands, and in which the one or more vibration visualization elements include first and second vibration visualization elements, a direction of movement, according to the vibration, of the part of each of the one or more optical members of the first vibration visualization element is different from a direction of movement, according to the vibration, of the part of each of the one or more optical members of the second vibration visualization element, the first color filter is disposed at least on an optical path of the light or the electromagnetic wave incident on the first vibration visualization element, or on an optical path of the reflected light or the reflected electromagnetic wave emitted from the first vibration visualization element, and the second color filter is disposed at least on an optical path of the light or the electromagnetic wave incident on the second vibration visualization element, or on an optical path of the reflected light or the reflected electromagnetic wave emitted from the first vibration visualization element.

According to an 11th aspect of the present disclosure, the vibration measurement system according to the ninth aspect is provided, in which the one or more vibration visualization elements include first and second vibration visualization elements, a direction of movement, according to the vibration, of the part of each of the one or more optical members of the first vibration visualization element is different from a direction of movement, according to the vibration, of the part of the one or more optical members of the second vibration visualization element, and a shape of the first vibration visualization element is different from a shape of the second vibration visualization element.

According to a 12th aspect of the present disclosure, the vibration measurement system according to the ninth aspect is provided, which further includes first and second color filters with different transmission wavelength bands, and in which the one or more vibration visualization elements include first and second vibration visualization elements, a natural frequency possessed by the part of each of the one or more optical members of the first vibration visualization element is different from a natural frequency possessed by the part of each of the one or more optical members of the second vibration visualization element, the first color filter is disposed at least on an optical path of the light or the electromagnetic wave incident on the first vibration visualization element, or on an optical path of the reflected light or the reflected electromagnetic wave emitted from the first vibration visualization element, and the second color filter is disposed at least on an optical path of the light or the electromagnetic wave incident on the second vibration visualization element, or on an optical path of the reflected light or the reflected electromagnetic wave emitted from the first vibration visualization element.

According to a 13th aspect of the present disclosure, a vibration measurement method is provided that is method of measuring vibration of the measurement object using one or more vibration visualization elements according to any one of the first to 12th aspects, the method including: attaching the one or more vibration visualization elements to the measurement object; capturing an image including the reflected light or the reflected electromagnetic wave emitted in the retroreflection direction by the one or more optical members of each of the one or more vibration visualization elements while the light or the electromagnetic wave is being emitted to the one or more vibration visualization elements; and measuring vibration of the measurement object based on the captured image.

According to a 14th aspect of the present disclosure, the vibration measurement method according to the 13th aspect is provided, in which the one or more vibration visualization elements are a plurality of vibration visualization elements, and the vibration visualization elements are attached to the measurement object to have sensitivity to vibration in different directions.

According to a 15th aspect of the present disclosure, the vibration measurement method according to the 13th or 14th aspect is provided, in which at start of vibration measurement or during vibration measurement, the light or the electromagnetic wave is blinked and emitted to the one or more vibration visualization elements, and a position of the vibration visualization element is identified by determining a portion in the captured image, which blinks in synchronization with blinking of the light or the electromagnetic wave.

Hereinafter, an embodiment of the present disclosure will be described with reference to the drawings. It is to be noted that the present disclosure is not limited by the embodiment. The same or similar components are labeled with the same symbol, and a description thereof may be omitted.

First Embodiment

FIG. 1 is a schematic configuration diagram of a vibration measurement system according to a first embodiment of the present disclosure. The vibration measurement system according to the first embodiment includes a vibration visualization element 1, a light source 2, an imaging device 3, and a vibration measurement device 4.

The vibration visualization element 1 is attached to a measurement object 100, such as a bridge or a tunnel to visualize vibration (for instance, mechanical vibration) applied to the measurement object 100. As illustrated in FIG. 1, the vibration visualization element 1 includes a case 11, and an optical member 12 having a retroreflective property for light or electromagnetic wave.

Figure 2:
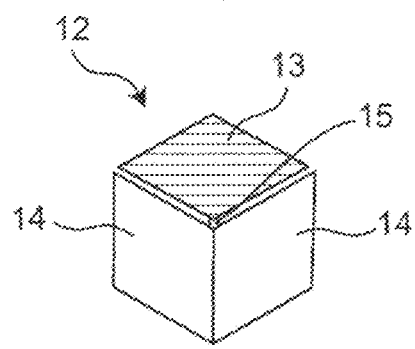
FIG. 2 is a perspective view of an optical member provided in the vibration measurement system of FIG. 1.

As illustrated in FIG. 2, the optical member 12 includes three mirrors arranged perpendicular to each other. In the first embodiment, one of the three mirrors is a movable mirror 13 that is moved according to vibration applied to the measurement object 100. Two out of the three mirrors are fixed mirrors 14. At least one of the two fixed mirrors 14 is fixed to the case 11. The movable mirror 13 is an example of the part of the optical member 12. The fixed mirrors 14 are an example of the other part of the optical member 12. The movable mirror 13 is moved relative to the fixed mirror 14 according to vibration. The case 11 is composed of, for instance, resin, metal, or a combination of these.

The movable mirror 13 is connected to at least one of the two fixed mirrors 14 via a spring 15 which is an example of the elastic member. As illustrated in FIG. 1, the movable mirror 13 is configured to be oscillated by the elastic force of the spring 15 between a position 13*a* illustrated by a dotted line and a position 13*b* illustrated by a dashed-dotted line.

The light source 2 is a device that irradiates the vibration visualization element 1 with light or electromagnetic wave. As the light source 2, is desirable to use a light source that is unlikely to cause flicker, for instance, a device such as a DC (direct current) driven LED. It is to be noted that the light source 2 may not be a particular light source as long as the light source 2 provides brightness according to an appropriate irradiation angle, and an image capture distance and environment for irradiating the measurement object 100. Examples of the light source 2 include, for instance, LED lighting, HID lighting, halogen lighting, a mercury lamp. The light source 2 includes, for instance, a light source such as a white LED and an emission optical system, and light is emitted through an emission port of the emission optical system.

As illustrated in FIG. 1, the imaging device 3 is a device that captures an image including the light or the electromagnetic wave emitted in a retroreflection direction by the optical member 12. In the first embodiment, the imaging device 3 is disposed in the vicinity of the light source 2. As the imaging device 3, for instance, a camera or a radar may be used. The imaging device 3 is a digital video camera equipped with, for instance, a CMOS or a CCD and an incident lens. For instance, the distance between the center of the incident lens of the imaging device 3 and the center of the light emission port of the light source 2 is desirably within 1 m, and more desirably within 50 cm. It is to be noted that the imaging device and the light source are desirably connected and fixed so that the mutual positional relationship is not changed during image capture. By doing so, even when the imaging device captures an image from a vehicle or is swung due to disturbance such as wind, stable image-capture and measurement is possible because of the retroreflective property of the vibration visualization element.

It is to be noted that the imaging device 3 is desirably capable of video capturing at a sufficient speed to capture a change in the luminance of reflected light or the amount of electromagnetic wave. It is to be noted that when the measurement object 100 is a large size structure like a bridge, the natural frequency of the structure is low such as several tens Hz or less. For this reason, even when a commonly available digital camera is used as the imaging device 3, it is possible to capture video at a sufficient speed.

The vibration measurement device 4 is a device that measures vibration based on the image captured by the imaging device 3. The vibration measurement device 4 can be implemented by software installed, for instance, in a personal computer. The vibration measurement device 4 includes, for instance, a memory that stores software and image data, a processor and a display.

Figure 3:
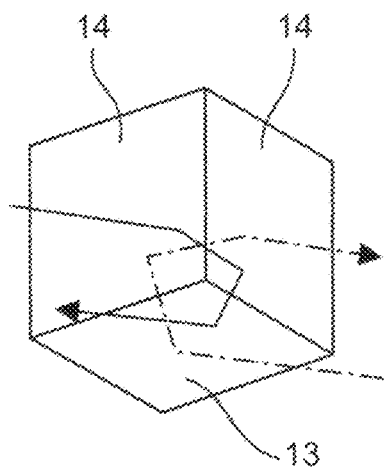
FIG. 3 is a perspective view illustrating the principle of reflection of light or electromagnetic wave by the optical member of FIG. 2.
Figure 4:
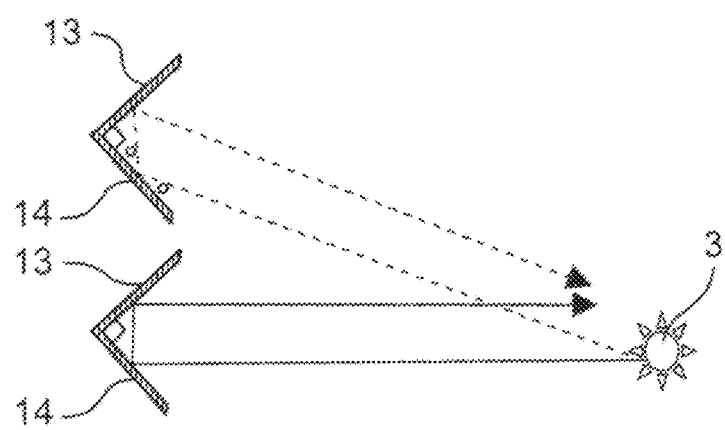
FIG. 4 is a side view illustrating the principle of reflection of light or electromagnetic wave by the optical member of FIG. 2.

When the movable mirror 13 is positioned in a perpendicular position with respect to two fixed mirrors 14, light or electromagnetic wave incident on the movable mirror 13 or the fixed mirrors 14 is reflected twice or 3 times as illustrated by the solid line arrow or the dashed-dotted line arrow of FIG. 3, and returns against the incident direction. In other words, the light or the electromagnetic wave reflected by the movable mirror 13 or the fixed mirrors 14 transmit in the opposite direction to the incident direction. Hereinafter, the transmission direction of the light or the electromagnetic wave transmitting in the opposite direction to the incident direction is referred to as "retroreflection direction". In this configuration, as long as the light or electromagnetic wave emitted from the light source 2 is incident on the inner surfaces of the three mirrors as illustrated in FIG. 4, the light or electromagnetic wave is reflected so as to return to the light source 2.

When the movable mirror 13 is displaced from a perpendicular position with respect to one of the two fixed mirror 14, for instance, when the movable mirror 13 is positioned in the position 13*a* illustrated by a dotted line and the position 13*b* illustrated by a dashed-dotted line as shown in FIG. 1, transmission directions B1, B2 of light or electromagnetic wave deviate from retroreflection direction A1. In this case, the imaging device 3 cannot receive reflected light or electromagnetic wave in the retroreflection direction.

When the measurement object 100 oscillates and accordingly the movable mirror 13 oscillates between the position 13*a* and the position 13*b* illustrated in FIG. 1, change occurs in the luminance of reflected light or the amount of electromagnetic wave received by the imaging device 3 in the retroreflection direction. In other words, there is correlation between vibration of the measurement object 100 and change in the luminance of reflected light or the amount of electromagnetic wave in the retroreflection direction. Therefore, it is possible to measure the vibration of the measurement object 100 based on the change in the luminance of reflected light or the amount of electromagnetic wave.

According to the first embodiment, since the optical member 12 has a retroreflective property, when the optical members 12 are irradiated with light or electromagnetic wave by one light source 2, reflected light or electromagnetic wave from the optical members 12 can be received by one imaging device 3. In other words, a plurality of vibration visualization elements 1 are attached to the measurement object 100, and the vibration visualization elements 1 are irradiated with light or electromagnetic wave from the light source 2, thereby making it possible for the imaging device 3 to simultaneously measure the change in the luminance of reflected light or the amount of electromagnetic waves reflected by the vibration visualization elements 1. Thus, it is possible to measure the vibration of the entire measurement object 100 in a shorter time. It is to be noted that when the movable mirror 13 is designed to vibrate in synchronization with the vibration of the measurement object 100, it is possible to measure the vibration of the measurement object 100 more accurately.

Also, according to the first embodiment, each vibration visualization element 1 does not include a component with high power consumption, such as a CPU, and thus there is no necessity of replacing batteries and the number of times of maintenance can be reduced. In addition, the manufacturing cost of the vibration visualization element 1 can be reduced and deterioration such as corrosion can be avoided.

Figure 5A:
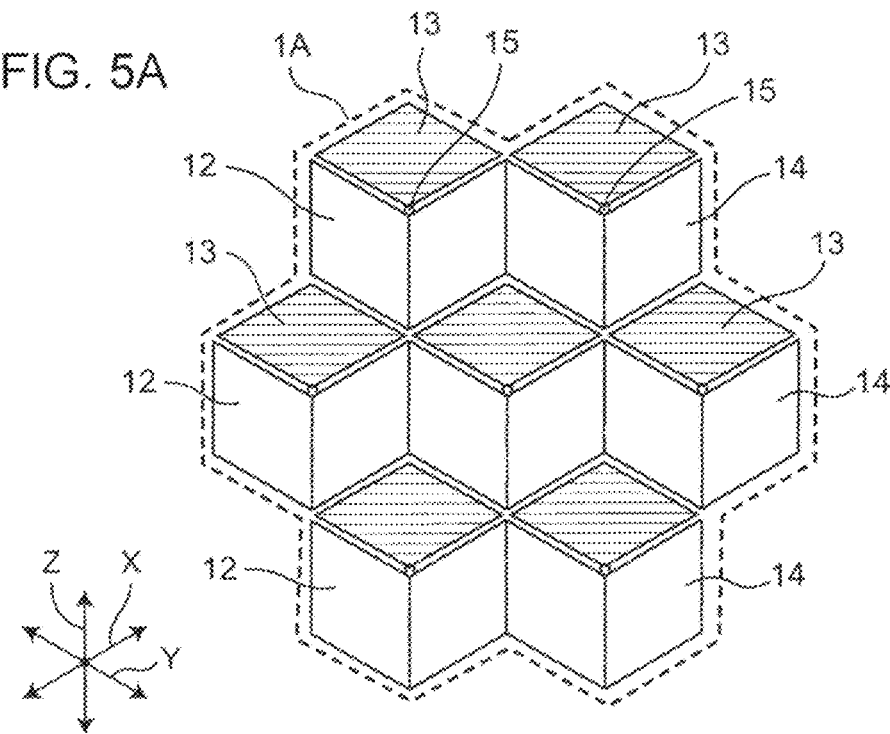
FIG. 5A is an illustration depicting an example of a vibration visualization element that includes multiple pieces of the optical member of FIG. 2 arranged without space.
Figure 5B:
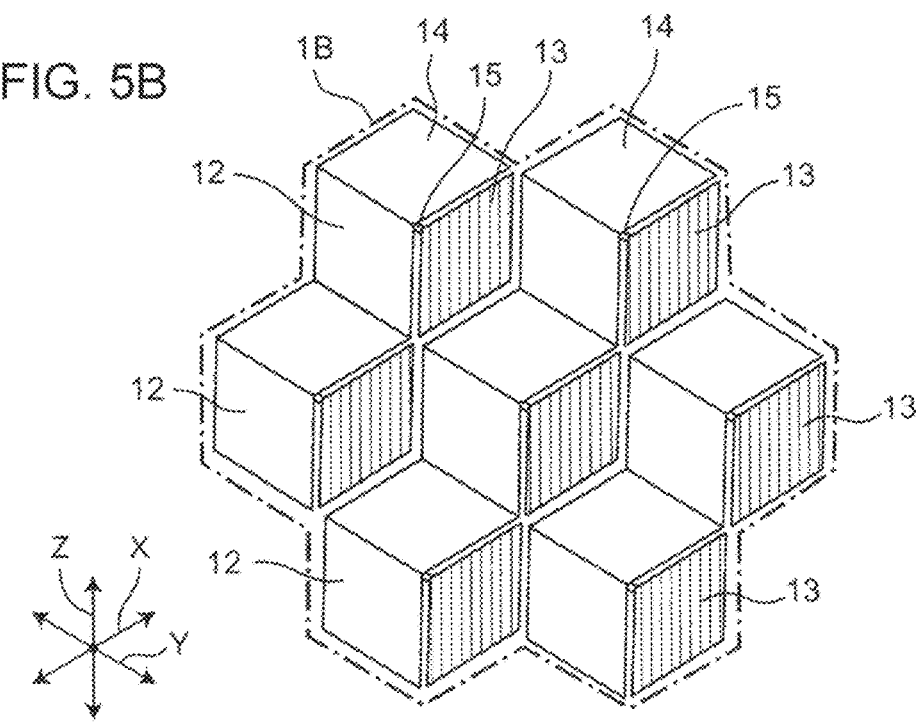
FIG. 5B is an illustration depicting another example of a vibration visualization element that includes multiple pieces of the optical member of FIG. 2 arranged without space.

Although the vibration visualization element 1 is equipped with one optical member 12 which includes three mirrors in the first embodiment, the present disclosure is not limited to this. As illustrated in FIG. 5A and FIG. 5B, the vibration visualization element 1 may include, for instance, a plurality of optical members 12 arranged without space. With this configuration, it is possible to measure the vibration of the measurement object 100 more accurately by increasing the reflective area for light or electromagnetic wave.

It is to be noted that FIG. 5A is an illustration in which the optical members 12 are arranged so that the movable mirror 13 of each optical member 12 is designed to vibrate in the Z direction. A vibration visualization element 1A illustrated in FIG. 5A can have sensitivity to vibration in the Z direction. Also, FIG. 5B is an illustration in which the optical members 12 are arranged so that the movable mirror 13 of each optical member 12 is designed to vibrate in the Y direction. A vibration visualization element 1B illustrated in FIG. 5B can have sensitivity to vibration in the Y direction.

In the example of FIG. 5A, the end of a connection side, in the Z direction, of two fixed mirrors 14, and one corner of the movable mirror 13 are connected by the spring 15 (for instance, a torsion spring with an arm angle of 90 degrees). Also, in the example of FIG. 5B, the end of a connection side, in the Y direction, of two fixed mirrors 14, and one corner of the movable mirror 13 are connected by the spring 15 (for instance, a torsion spring with an arm angle of 90 degrees). In other words, the movable mirror 13 is connected to the two fixed mirrors 14 via an elastic member. A clearance is provided between the movable mirror 13 and the two fixed mirrors 14 to avoid collision of the movable mirror 13 with the two fixed mirrors 14. Shock absorbing material may be provided in the movable mirror 13 to avoid direct collision of the movable mirror 13 with the two fixed mirrors 14. Alternatively, any one side of the two fixed mirrors 14 and one side of the movable mirror 13 may be connected by an elastic member (for instance, a hinge and a torsion spring with an arm angle of 90 degrees).

Also, color filters with mutually different colors may be disposed in front (the light source 2 side) of the vibration visualization element (an example of the first vibration visualization element) 1A illustrated in FIG. 5A, and the vibration visualization element (an example of the second vibration visualization element) 1B illustrated in FIG. 5B. The color filters with mutually different colors are an example of the first and second color filters with different transmission wavelength bands. The first color filter may be disposed at least on an optical path of light or electromagnetic wave incident on the vibration visualization element 1A, or on an optical path of reflected light or reflected electromagnetic wave emitted from the vibration visualization element 1A. The second color filter may be disposed at least on an optical path of light or electromagnetic wave incident on the vibration visualization element 1A, or on an optical path of reflected light or reflected electromagnetic wave emitted from the vibration visualization element 1A. For instance, a red color filter may be disposed in front of the vibration visualization element 1A, whereas a blue color filter may be disposed in front of the vibration visualization element 1B.

With this configuration, when the movable mirror 13 of the vibration visualization element 1A vibrates in the Z direction, the vibration visualization element 1A appears to be blinking in red. Attaching the vibration visualization element 1A to the measurement object 100 enables measurement of the vibration of the measurement object 100 in the Z direction. Also, with the above-mentioned configuration, when the movable mirror 13 of the vibration visualization element 1B vibrates in the Y direction, the vibration visualization element 1B appears to be blinking in blue. Attaching the vibration visualization element 1B to the measurement object 100 enables measurement of the vibration of the measurement object 100 in the Z direction. In addition, when the vibration visualization elements 1A, 1B are distributed and disposed on the entire measurement object 100, the vibration of the measurement object 100 in two axial directions (Y, Z directions) can be measured independently.

Also, a vibration visualization element having sensitivity to vibration in the X direction may be created, and a color filter with a color different from red and blue (for instance, green) may be disposed in front of the vibration visualization element. When the vibration visualization element and the vibration visualization elements 1A, 1B are distributed and disposed on the entire measurement object 100, the vibration of the measurement object 100 in three axial directions (X, Y, Z directions) can be measured independently.

It is to be noted that in the case where the optical member 12 is affected by a factor such as wind or corrosion other than the vibration of the measurement object 100, it is not possible to accurately measure the vibration of the measurement object 100. Thus, it is desirable to seal the optical member 12 by providing a cover so as to cover the optical member 12. Also, it is desirable that antifouling surface treatment or the like be applied to the surface of the optical member 12 or the cover.

It is to be noted that the shapes of the vibration visualization elements 1A, 1B are not limited to the shapes illustrated in FIG. 5A and FIG. 5B, and may be various shapes. For instance, the shape of the vibration visualization elements 1A, 1B may be a figure such as a triangle or a quadrilateral, or a character. In this case, when the shapes of the vibration visualization element 1A and the vibration visualization element 1B are made different and distributed and disposed on the entire measurement object 100, the vibration of the measurement object 100 in two axial directions can be measured independently. Also, a vibration visualization element having sensitivity to vibration in the X direction may be formed in a shape different from the shapes of the vibration visualization elements 1A, 1B. When the vibration visualization elements 1A, 1B are distributed and disposed on the entire measurement object 100, the vibration of the measurement object 100 in three axial directions (X, Y, Z directions) can be measured independently.

Although one of the three mirrors provided in the optical member 12 is a movable mirror 13 and two of them are fixed mirrors 14 in the first embodiment, the present disclosure is not limited to this. For instance, two of the three mirrors provided in the optical member 12 may be each a movable mirror 13 and one of them may be a fixed mirror 14. In this case, the two movable mirrors 13 may be connected to two sides of the fixed mirror 14 by elastic members (for instance, hinges and torsion springs with an angle of 90 degrees). It is to be noted that a clearance is provided between the two movable mirrors 13 and the fixed mirror 14 to avoid direct collision between the two movable mirrors 13. Shock absorbing material may be provided in the two movable mirrors 13 to avoid direct collision between the two movable mirrors 13. With this configuration, sensitivity to vibration in two axial directions can be achieved. However, with this configuration, it is difficult to detect a vibration direction by one imaging device 3. In this case, two or more imaging devices 3 may be installed. For instance, in order to detect light or electromagnetic wave transmitting in the transmission direction B1 deviates in the Z direction with respect to a retroreflection direction, another imaging device 3 may be installed above the imaging device 3 illustrated in FIG. 1. With this configuration, a vibration component in the Z direction can be identified, and the component in the Y direction can be extracted by removing the Z-component from a detection signal of the imaging device 3.

Although the optical member 12 includes three mirrors in the first embodiment, the present disclosure is not limited to this. For instance, the optical member 12 may include two mirrors: one movable mirror 13 and one fixed mirror 14. In this case, although light or electromagnetic wave diagonally incident on the optical member 12 cannot be retroreflected, light or electromagnetic wave perpendicularly incident on the optical member 12 can be retroreflected.

Also, in FIG. 1 to FIG. 5B, the shape of the movable mirror 13 and the fixed mirror 14 is illustrated as a rectangle, the present disclosure is not limited to this. For instance, the shape of the movable mirror 13 and the fixed mirror 14 may be a triangle.

It is to be noted that the movable mirror 13, the fixed mirror 14, and the spring 15 can be produced by machining such as cutting, bending, bonding, welding of, for instance, metal foil such as stainless steel (with a thickness on the order of several μm to 100 μm) with a laser. Also, for the movable mirror 13 and the fixed mirror 14, a body may be formed by plastic molding, for instance, and a specular surface may be formed by vapor-depositing aluminum or the like on the surface of the body. Also, the case 11 of the vibration visualization element 1 supporting one end of the spring 15 and the fixed mirror 14 is desirably produced with an accurate angle and shape by plastic molding.

In the case where the light source 2 is a device that radiates with electromagnetic wave, the electromagnetic wave desirably has a longer wavelength than light has. Also, in this case, the size of the specular surface in a flat state of the movable mirror 13 and the fixed mirror 14 is desirably larger than the wavelength of the electromagnetic wave. Thus, the case where the light source 2 irradiates with electromagnetic wave can be handled similarly to the case where the light source 2 irradiates with light. It is to be noted that when electromagnetic wave with a long wavelength is used, vibration can be measured from a more remote location, for instance, a satellite.

Figure 6:
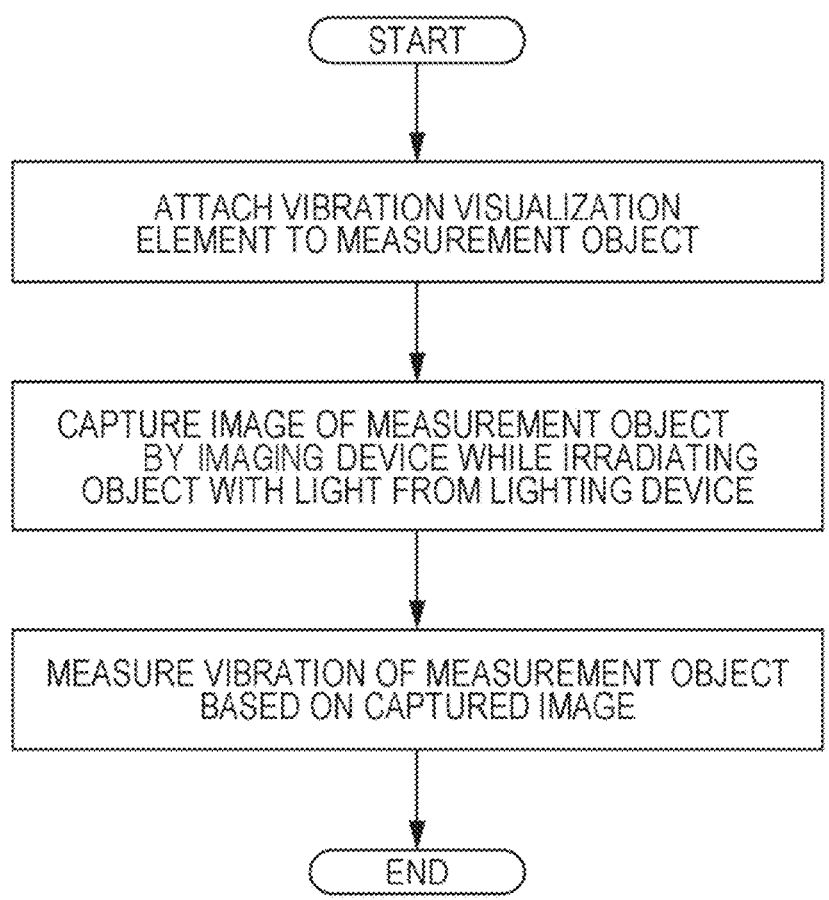
FIG. 6 is a flow chart of a vibration measurement method using the vibration measurement system of FIG. 1.
Figure 7:
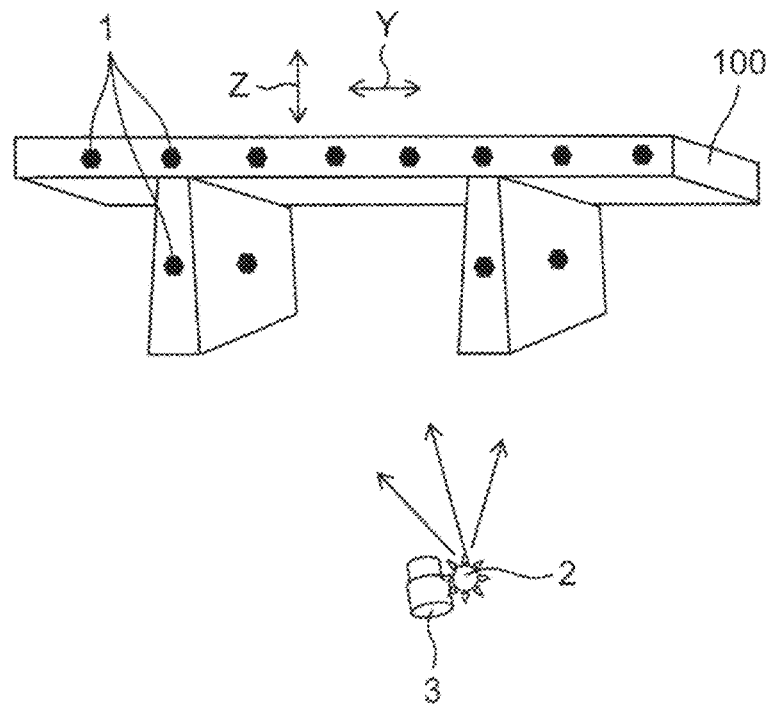
FIG. 7 is a perspective view illustrating the manner in which vibration of a bridge is measured using the vibration measurement system of FIG. 1.

Next, a vibration measurement method using the vibration measurement system according to the first embodiment will be described. FIG. 6 is a flow chart of the vibration measurement method. Here, as illustrated in FIG. 7, it is assumed that the measurement object 100 is a bridge. Hereinafter, in order to simplify the description, the light source 2 is assumed to emit light only and description of electromagnetic wave is omitted.

First, in step S1, a plurality of vibration visualization elements 1 are attached to the measurement object 100.

Although a portion of the measurement object 100, which is likely to deteriorate, depends on the type and structure of the measurement object 100, the vibration visualization elements 1 are desirably distributed and installed around the portion so that a vibration mode of the entire measurement object 100 can be estimated. Since the vibration visualization element 1 according to the first embodiment does not include a component with high power consumption, such as a CPU, the vibration visualization element 1, once attached to the measurement object 100, can be used for a long time. Thus, the vibration visualization element 1 is desirably fixed firmly so as not to come off from the measurement object 100.

Next, in step S2, as illustrated in FIG. 7, the measurement object 100 is irradiated with light from the light source 2, and an image including light reflected in a retroreflection direction by the optical member 12 of the vibration visualization element 1 is captured by the imaging device 3.

In step S2, the image captured by the imaging device 3 is such that the vibration visualization elements blink according to the vibration of the measurement object 100. When the measurement object 100 is a bridge, it is known that the vibration of the bridge mainly includes components in two axial directions: the Z direction (that is, the vertical direction) and the Y direction (that is, the major axis direction of the bridge). Thus, the vibration visualization element 1A illustrated in FIG. 5A and the vibration visualization element 1B illustrated in FIG. 5B are distributed and disposed on the entire bridge, and vibration thereby can be measured in the two axial directions: the Z direction and the Y direction.

Next, in step S3, the vibration measurement device 4 measures the vibration of the measurement object 100 based on the image captured by the imaging device 3. For instance, the vibration measurement device 4 performs image processing such as sampling change in luminance of pixels at specific positions from the image on each frame of a video captured by the imaging device 3. Thus, the vibration waveforms of the vibration visualization elements 1 captured in the images can be extracted, and it is possible to measure the frequencies, phase, and amplitude of the vibration of the measurement object 100 at multiple spots.

With the vibration measurement method according to the first embodiment, the vibration visualization elements 1 blink according to the vibration of the measurement object 100, and thus it is also possible to make visual observations of the vibration of the measurement object 100. In addition, the retroreflected light to the vibration visualization element 1 has high directivity, and thus observation is possible even at a position several hundred meters away from the measurement object 100, for instance. Even in the case where blurring of focus or shaking occurs to some extent due to microvibration of the imaging device 3 itself, it is possible to measure the vibration of the measurement object 100 when change in luminance of reflected light is detectable. Therefore, it can be stated that the vibration measurement method according to the first embodiment has higher resistance to change in noise and environment compared with a conventional method.

It is to be noted that the vibration measurement device 4 desirably includes a storage unit that accumulates and stores measured vibration data of the measurement object 100, and a notification unit that notifies of abnormality by characters or voice or the like. The storage unit is, for instance, a semiconductor memory. The notification unit is, for instance, a monitor and/or a speaker. With this configuration, comparison between the past vibration data accumulated in the storage unit and the vibration data measured this time enables detection of abnormal spots and degree of abnormality of the measurement object 100. Also, the notification unit notifies the administrator of abnormality based on a result of the detection, thereby enabling early maintenance of the measurement object 100.

It is to be noted that in step S2, the light emitted from the light source 2 may blink periodically near the vibrational frequency of the measurement object 100. In this case, due to image capture using a stroboscope, the differential frequency between the vibrational frequency of the measurement object 100 and the frequency of the stroboscope vibrates like undulations, and thus detailed frequency of vibration number can be identified from the undulations.

It is to be noted that the light source 2 and the imaging device 3 may be fixed to a position away from the measurement object 100 or installed in a vehicle such as automobile or a helicopter. The light source 2 and the imaging device 3, when being fixed to a position away from the measurement object 100, may be installed, for instance, at the side of a light source that illuminates a bridge for light-up or safety. In this manner, fixed point observation can be made.

Also, when the light source 2 and the imaging device 3 are installed in an automobile, the weight and velocity of the automobile are made constant, thereby making it possible to stably measure the vibration of the measurement object 100 due to the effect of the weight of the automobile. When an image is captured by the imaging device 3 mounted in a vehicle such as an automobile, the position of the vibration visualization element 1 moves in the captured image. However, once the position is identified, it is easy to extract and track the characteristics by image processing.

Figure 8:
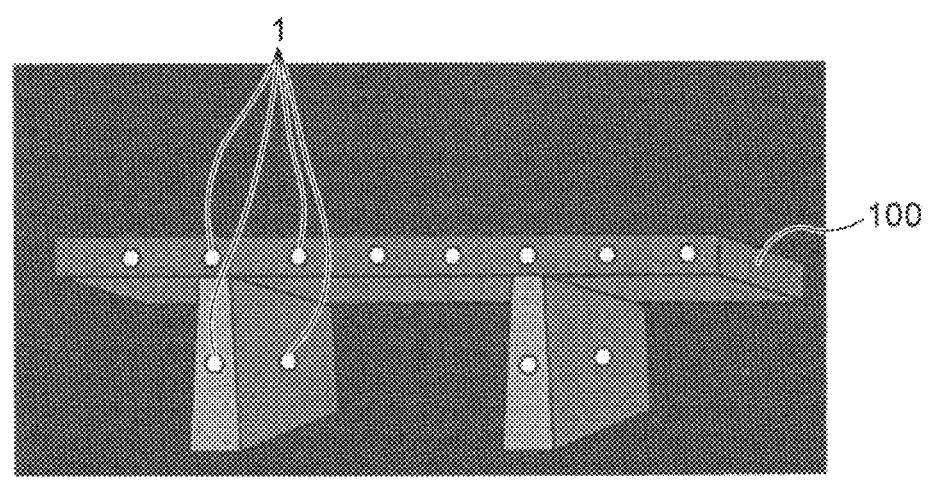
FIG. 8 is a view illustrating an image of a bridge captured at night.

It is to be noted that when an image is captured with visible light by a commonly available digital camera, it is better to capture an image in a situation where the sunlight has little effect, for instance, at night. In this case, as illustrated in FIG. 8, an image captured by the imaging device 3 includes, for instance, the measurement object 100 dimly illuminated by the light source 2, the vibration visualization element 1 brightly illuminated by retroreflection, and a background such as light of streetlights or buildings. It is necessary to extract the positions of the vibration visualization elements 1 from the image. In this case, for instance, at the time of start of vibration measurement or during vibration measurement, the light of the light source 2 is blinked, and it is possible to identify the position of each vibration visualization element 1 by determining a portion in which the light reflected by the vibration visualization element 1 and the light of the light source 2 are synchronized to blink. In other words, light is blinked and emitted to the vibration visualization elements 1 from the light source 2, and an image including reflected light is captured by the imaging device. In the captured image, a portion, which blinks in synchronization with blinking of the light from the light source 2 and is brighter than the surroundings, is determined, thereby making it possible to identify the positions of the vibration visualization elements.

It is to be noted that as the light source 2, an LED may be used which emits light in a wavelength range in which the spectrum of the sunlight is weak on the ground due to absorption of water molecules, for instance, the vicinity of 1.35 µm or the vicinity of 1.15 µm. In this case, the effect of the sunlight is reduced and vibration measurement with a high S/N ratio is possible even in daytime.

Next, desirable design parameters of the movable mirror 13 of the vibration visualization element 1 will be described.

When the specular surfaces are perpendicular to one another, retroreflection by three mirrors has directivity in which the angle of dispersion is theoretically infinitesimal. However, practically, the specular surface usually has warpage or concave/convex. Also, in the case of an assembled set of three mirrors, variation in angle also occurs. Therefore, retroreflected light has dispersion.

Figure 9:
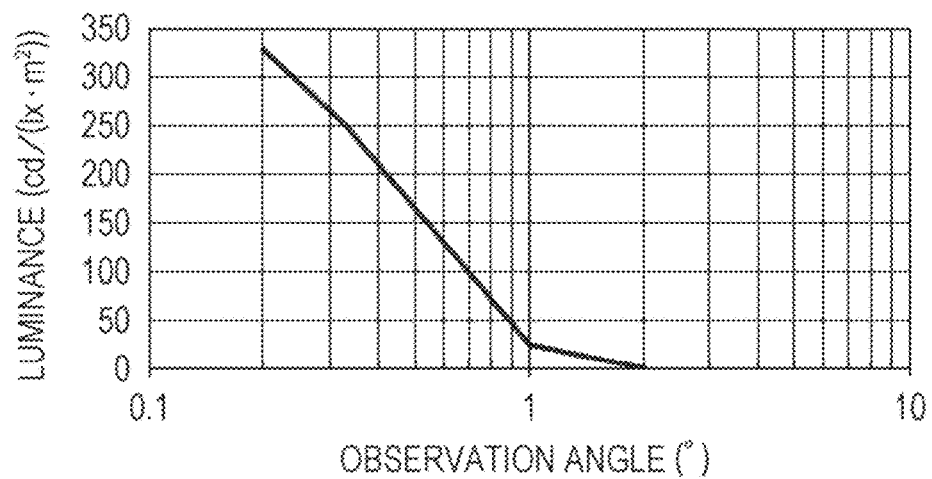
FIG. 9 is a graph illustrating actual characteristics of retroreflection by three mirrors.

FIG. 9 is a graph illustrating actual characteristics of retroreflection by three mirrors. The graph illustrates a result of measurement of the luminance of reflected light while the observation angle is changed, where the incident direction (=retroreflection direction) of illumination is set to 0 degrees. In FIG. 6, the horizontal axis indicates observation angle and the vertical axis indicates luminance.

As illustrated in FIG. 9, the luminance of reflected light increases as the observation angle is decreased. When the observation angle is approximately 2 degrees or greater, the luminance is about 0 (cd/lx·m²). On the other hand, in FIG. 1, when the angle of the movable mirror 13 with respect to the fixed mirror 14 is displaced by 0° from 90°, the reflection direction is displaced by 20°. In other words, when the angle of the movable mirror 13, with respect to the fixed mirror 14, of the optical member 12 having the characteristics of retroreflection of FIG. 9 is displaced by 1° from 90°, the luminance of reflected light becomes 0. Therefore, design is desirably made such that when a maximum acceleration of expected vibration of the measurement object 100 is applied to the vibration visualization element 1, the angle of the movable mirror 13 changes in a range of 1° or less. Consequently, it is possible to obtain the luminance of reflected light which has a positive correlation with the amplitude of vibration of the vibration visualization element 1.

It is to be noted that the equation of motion for the movable mirror 13 can be basically calculated based on the vibration of the spring 15. That is, $m\alpha = -kx$ where m is mass, $\alpha$ is acceleration, k is spring constant, x is displacement of spring (or $\theta$). Thus, the spring constant and mass of the spring 15 can be set according to the acceleration $\alpha$ of the measurement object 100.

Also, the natural frequency (Hz) in the equation of motion is given by $\lambda = (1/2\pi)(k/m)^{1/2}$. In the case where the frequency of the vibration received by the vibration visualization element 1 is close to the natural frequency of the movable mirror 13, resonance may occur. For this reason, the natural frequency of the movable mirror 13 is desirably set to, for instance, the magnitude of about 3 times a maximum frequency of the measurement object 100. When the measurement object 100 is a bridge, a maximum frequency is on the order of 10 to 50 Hz, and thus setting the natural frequency on the order of 30 to 150 Hz reduces the frequency dependence.

Figure 10:
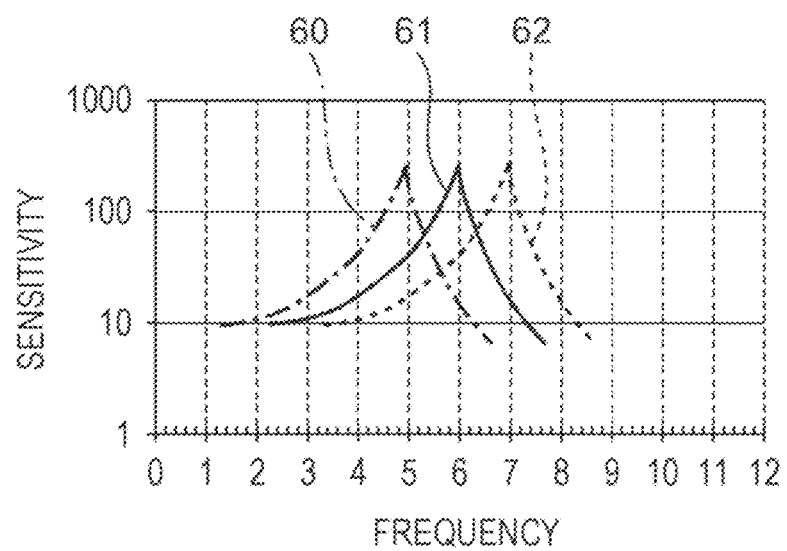
FIG. 10 is a characteristic diagram illustrating a frequency dependence of three optical members with different natural frequencies of movable mirror.

Alternatively, the natural frequency of the movable mirror 13 may be set as follows. FIG. 10 is a characteristic diagram illustrating the frequency dependence of three vibration visualization elements 1 with different natural frequencies of the movable mirror 13. The characteristic of FIG. 10 is obtained such that the vibration visualization element 1 is installed on a vibration generator, and the amplitude of the luminance of reflected light in the retroreflection direction is measured by a luminance meter disposed in the vicinity the light source while the frequency and intensity of vibration to be applied is being varied, and a relative sensitivity is calculated based on the ratio of the amplitude of vibration to the amplitude of luminance.

A dashed-dotted line 60, a solid line 61, a dotted line 62 indicate a relative sensitivity when the natural frequency of the movable mirror 13 is 5.0 Hz, 6.0 Hz, 7.0 Hz, respectively. For instance, when the natural frequency of the movable mirror 13 is 6.0 Hz, as indicated by the solid line 61, the relative sensitivity is on the order of "10" for 2 Hz or less, whereas the relative sensitivity is "200" or greater for 6.0 Hz. That is, the relative sensitivity when the frequency is 6 Hz is 20 times greater than the relative sensitivity when the frequency is 2 Hz or less. By utilizing the difference in relative sensitivity between the normal time and the resonance time, the sensitivity of the vibration visualization element 1 can be increased.

For instance, color filters with different colors may be disposed in front of three respective vibration visualization elements 1 with different natural frequencies of the movable mirrors 13. Here, color filters in blue, green, and red are disposed in front of three respective vibration visualization elements 1 with natural frequencies of the movable mirrors 13 of 5.0 Hz, 6.0 Hz, and 7.0 Hz. The movable mirrors 13 of these three vibration visualization elements 1 vibrate according to the vibration applied to the vibration visualization elements 1. At this point, the luminances of reflection light reflected by the vibration visualization elements 1 in the retroreflection direction are different, and thus the colors of reflected light captured by the imaging device 3 appear to be different.

For instance, when vibration with 6.0 Hz is applied to each vibration visualization element 1, almost only green in the reflected light blinks, and thus blinking of the complementary color magenta is seen. On the other hand, when vibration with 5.5 Hz is applied to each vibration visualization element 1, green and blue blinking are mixed in reflected light, and blinking of the complementary color red is seen. That is, by the difference in color (wavelength dispersion) of reflected light, the frequency of vibration applied to the vibration visualization element 1 can be recognized. By utilizing this relationship, the vibration of the measurement object 100 can be analyzed not only in a video but also in a still image.

In this case, it is desirable that the natural frequency of the measurement object 100 be checked before the vibration visualization element 1 is installed in the measurement object 100, and the natural frequency of each movable mirror 13 of the vibration visualization elements 1 be set so as to be close to the natural frequency of the measurement object 100. Adjustment of the natural frequency of the movable mirror 13 is made possible, for instance, by adjusting the processing dimensions of the spring 15 or attaching a weight to the spring 15.

Second Embodiment

Figure 11:
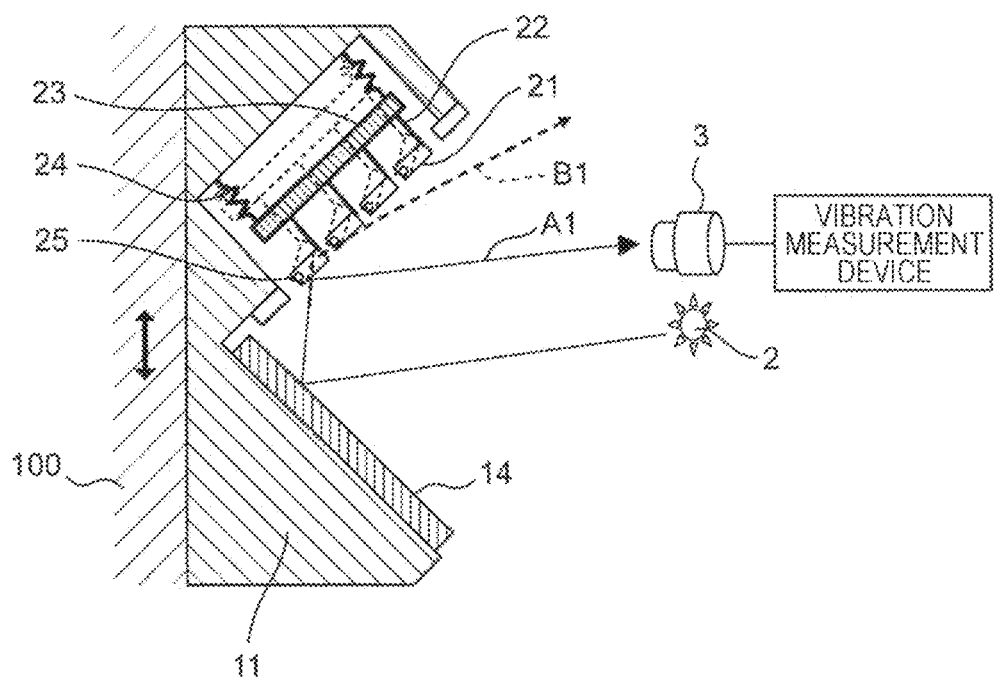
FIG. 11 is a schematic configuration diagram of a vibration measurement system according to a second embodiment of the present disclosure.

FIG. 11 is a schematic configuration diagram of a vibration measurement system according to a second embodiment of the present disclosure.

The vibration measurement system according to the second embodiment differs from the vibration measurement system according to the first embodiment in that instead of the movable mirror 13 and the spring 15, a plurality of movable mirrors 21, a connection member 22, a weight 23, and a plurality of springs 24 which are an example of elastic member are provided. Other components are the same as in the first embodiment.

The movable mirrors 21 are formed to be elongated and disposed in parallel each other. The total area of the movable mirrors 21 is approximately the same as the area of one movable mirror 13 in the first embodiment. One end of each of the movable mirrors 21 is connected to the weight 23 via the connection member 22. The movable mirrors 21 are an example of the part of the optical member. The weight 23 is attached to the case 11 via the springs 24. The other end of each of the movable mirrors 21 is connected to a rotational shaft 25. Each rotational shaft 25 is fixed to the case 11, for instance. When the measurement object 100 vibrates, each spring 24 vibrates, and accordingly, each movable mirror 21 turns with respect of the rotational shaft 25 as a center, as indicated by the dotted line and the solid line in FIG. 11. Thus, the angle of each movable mirror 21 with respect to the fixed mirror 14 changes.

According to the second embodiment, even when the vibration of the measurement object 100 is fine, the angle of each movable mirror 21 with respect to the fixed mirror 14 changes significantly. Consequently, even when the measurement object 100 is a large size structure having a low natural frequency, the vibration can be measured with higher sensitivity.

Third Embodiment

Figure 12A:
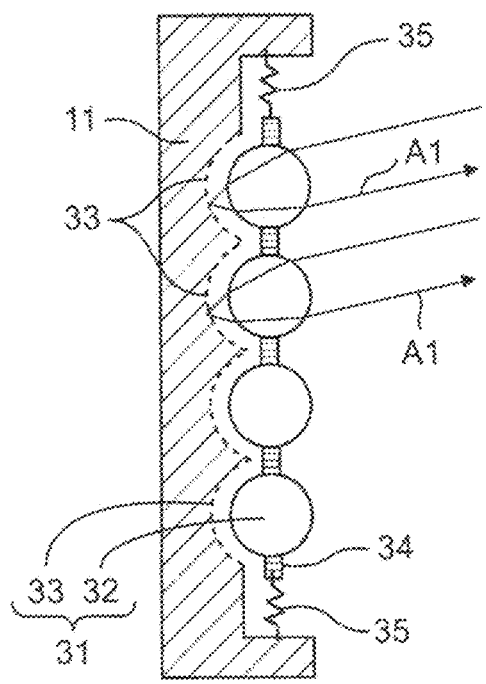
FIG. 12A is a schematic configuration diagram of a vibration visualization element included in a vibration measurement system according to a third embodiment of the present disclosure.
Figure 12B:
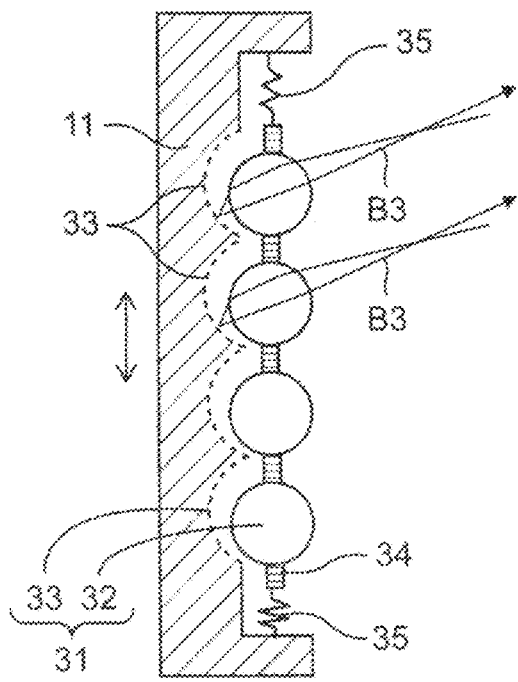
FIG. 12B is a schematic configuration diagram of the vibration visualization element included in the vibration measurement system according to the third embodiment of the present disclosure.

FIG. 12A and FIG. 12B are a schematic configuration diagram of a vibration visualization element included in a vibration measurement system according to a third embodiment of the present disclosure.

The vibration measurement system according to the third embodiment differs from the vibration measurement system according to the first embodiment in that instead of the optical member 12, an optical member 31 having a bead type structure is provided. Other components are the same as in the first embodiment.

The optical member 31 includes a spherical lens 32, and a concave reflector 33 that is disposed behind (the side away from the light source 2) the spherical lens 32 and movable independently to the spherical lens 32. The concave reflector 33 has a concave reflective surface concentrically with the spherical lens 32. In other words, the concave reflector 33 has a partially spherical shape. The spherical lens 32 is an example of the part of the optical member 31 and the concave reflector 33 is an example of the other part of the optical member 31.

When the case 11 of the vibration visualization element 1 of the present embodiment is standing still, as illustrated in FIG. 12A, light or electromagnetic wave emitted from the light source 2 passes through the spherical lens 32 and is concentrated on the concave reflector 33. Subsequently, the light or electromagnetic wave is reflected by the concave reflector 33 and is incident on the spherical lens 32 again, passes along a path symmetrical with respect to the center of the spherical lens 32, and transmits in the retroreflection direction. At this point, the luminance of the reflected light or the amount of electromagnetic wave in the retroreflection direction attains a maximum.

On the other hand, when the case 11 of the vibration visualization element 1 is moved, and the relative position between the spherical lens 32 of the optical member 31 and the concave reflector 33 is changed as illustrated in FIG. 12B, transmission direction B3 of reflected light or electromagnetic wave deviates from retroreflection direction A1. At this point, the imaging device 3 cannot receive the reflected light or electromagnetic wave in the retroreflection direction.

Therefore, when the case 11 of the vibration visualization element 1 vibrates and the spherical lens 32 of the optical member 31 vibrates accordingly, change occurs in the luminance of the reflected light or the amount of electromagnetic wave received by the imaging device 3 in the retroreflection direction. It is possible to measure the vibration of the measurement object 100 based on the change in the luminance of the reflected light or the amount of electromagnetic wave.

Also, in the third embodiment, the optical members 31 are arranged without space. The spherical lens 32 of each optical member 31 is supported by a support member 34 as illustrated in FIG. 12A and FIG. 12B. The support member 34 is, for instance, a plate-like member having a plurality of holes to receive the spherical lens 32, and is attached to the case 11 of the vibration visualization element 1 via the spring 35 which is an example of the elastic member. The support member 34 is composed of, for instance, resin, metal, or a combination thereof.

According to the third embodiment, since the optical member 31 has a retroreflective property, when the optical members 31 are irradiated with light or electromagnetic wave by one light source 2, reflected light or electromagnetic wave from the optical members 31 can be received by one imaging device 3. In other words, a plurality of vibration visualization elements 1 are attached to the measurement object 100, and the vibration visualization elements 1 are irradiated with light or electromagnetic wave from the light source 2, thereby making it possible for the imaging device 3 to simultaneously measure the change in the luminance of reflected light or the amount of electromagnetic waves reflected by the vibration visualization elements 1. Thus, it is possible to measure the vibration of the entire measurement object 100 in a shorter time. It is to be noted that when the spherical lens 32 is designed to vibrate in synchronization with the vibration of the measurement object 100, it is possible to measure the vibration of the measurement object 100 more accurately.

Also, according to the third embodiment, each vibration visualization element 1 does not include a component with high power consumption, such as a CPU, and thus there is no necessity of replacing batteries and the number of times of maintenance can be reduced. In addition, the manufacturing cost of the vibration visualization element 1 can be reduced and deterioration such as corrosion can be avoided.

Fourth Embodiment

Figure 13A:
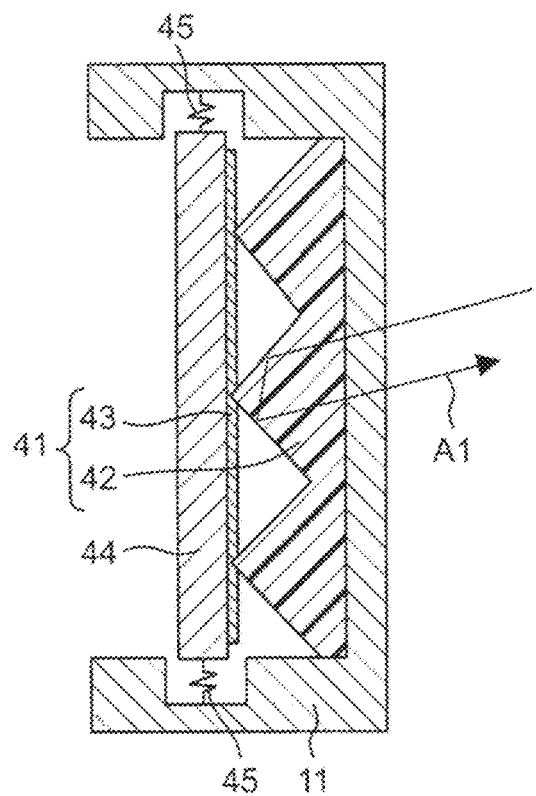
FIG. 13A is a schematic configuration diagram of a vibration visualization element included in a vibration measurement system according to a fourth embodiment of the present disclosure.
Figure 13B:
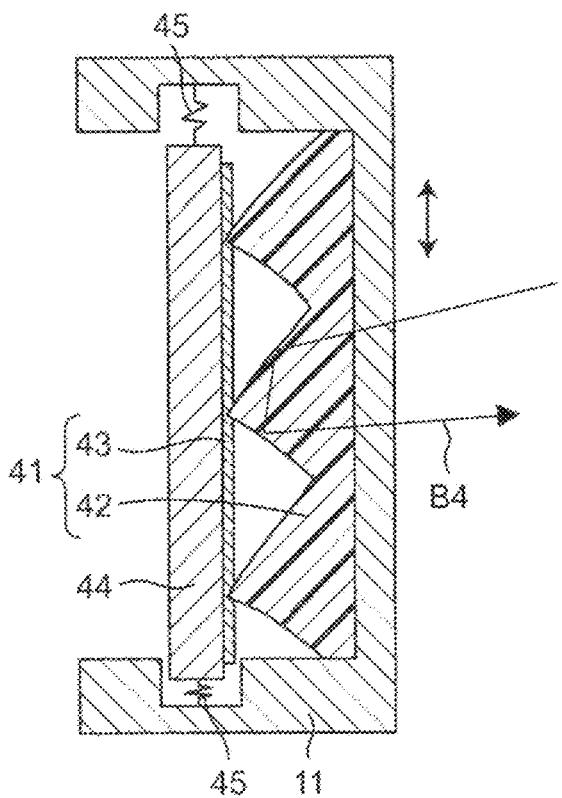
FIG. 13B is a schematic configuration diagram of the vibration visualization element included in the vibration measurement system according to the fourth embodiment of the present disclosure.

FIG. 13A and FIG. 13B are a schematic configuration diagram of a vibration visualization element included in a vibration measurement system according to a fourth embodiment of the present disclosure.

The vibration measurement system according to the fourth embodiment differs from the vibration measurement system according to the first embodiment in that instead of the optical member 12, an optical member 41 having a corner cube type structure is provided. Other components are the same as in the first embodiment.

The optical member 41 includes corner cubes 42 and a deformation member 43 that comes into contact with the top portion of each corner cube 42 to cause the corner cube 42 to be deformed.

The corner cube 42 is composed of a transparent and flexible resin such as silicone rubber or gel, and has three faces that form a corner of a cube. The corner cube 42 allows retroreflection by the three faces. Also, the corner cube 42 is attached to an inner face of the case 11 of the vibration visualization element 1.

The deformation member 43 is attached to the weight 44. The deformation member 43 is, for instance, a flat plate such as rubber, resin, or metal, and has a recessed portion that receives the top portion of the corner cube 42. The top portion of the corner cube 42 may be fixed to the deformation member 43 by an adhesive or the like. The weight 44 is formed in a plate-like shape, for instance. Both ends of the weight 44 are attached to the case 11 of the vibration visualization element 1 via a spring 45 which is an example of the elastic member. In the fourth embodiment, the case 11 is composed of a member that allows light or electromagnetic wave to pass through.

When the case 11 of the vibration visualization element 1 is standing still, as illustrated in FIG. 13A, light or electromagnetic wave emitted from the light source 2 passes through the case 11 to be incident on the corner cube 42, and is totally reflected by the interface between the faces of the corner cube 42 and air. Subsequently, the light or electromagnetic wave passes through the inside of the corner cube 42 and the case 11, and transmits in the retroreflection direction. At this point, the luminance of the reflected light or the amount of electromagnetic wave in the retroreflection direction attains a maximum.

On the other hand, when the case 11 of the vibration visualization element 1 is moved, and the relative position between the corner cube 42 and the deformation member 43 is changed as illustrated in FIG. 13B, the deformation member 43 deforms the top portion of the corner cube 42. Thus, the faces of the corner cube 42 are slightly curved and the angle between the faces is no longer a right angle. Consequently, transmission direction B4 of the light or electromagnetic wave reflected by the interface between the faces of the corner cube 42 and air deviates from the retroreflection direction A1. At this point, the imaging device 3 cannot receive the reflected light or electromagnetic wave in the retroreflection direction. The top portion of the corner cube 42 is an example of the part of the optical member 41. The part other than the top portion of the corner cube 42 is an example of the other part of the optical member 41.

Therefore, when the case 11 of the vibration visualization element 1 vibrates and the corner cube 42 of the optical member 41 vibrates accordingly, change occurs in the luminance of the reflected light or the amount of electromagnetic wave received by the imaging device 3 in the retroreflection direction. It is possible to measure the vibration of the measurement object 100 based on the change in the luminance of the reflected light or the amount of electromagnetic wave.

Also, in the fourth embodiment, the optical members 41 are arranged without space. As illustrated in FIG. 13A and FIG. 13B, the corner cubes 42 of the optical members 41 are connected so as to mutually share a portion. In other words, the optical members 41 are formed of a prism-shaped sheet. The deformation member 43 of each optical member 41 is integrated with a plate-like shape.

According to the fourth embodiment, since the optical member 41 has a retroreflective property, when the optical members 41 are irradiated with light or electromagnetic wave by one light source 2, reflected light or electromagnetic wave from the optical members 41 can be received by one imaging device 3. In other words, a plurality of vibration visualization elements 1 are attached to the measurement object 100, and the vibration visualization elements 1 are irradiated with light or electromagnetic wave from the light source 2, thereby making it possible for the imaging device 3 to simultaneously measure the change in the luminance of reflected light or the amount of electromagnetic waves reflected by the vibration visualization elements 1. Thus, it is possible to measure the vibration of the entire measurement object 100 in a shorter time. It is to be noted that when the deformation member 43 is designed to vibrate in synchronization with the vibration of the measurement object 100, it is possible to measure the vibration of the measurement object 100 more accurately.

Also, according to the fourth embodiment, each vibration visualization element 1 does not include a component with high power consumption, such as a CPU, and thus there is no necessity of replacing batteries and the number of times of maintenance can be reduced. In addition, the manufacturing cost of the vibration visualization element 1 can be reduced and deterioration such as corrosion can be avoided.

Figure 14A:
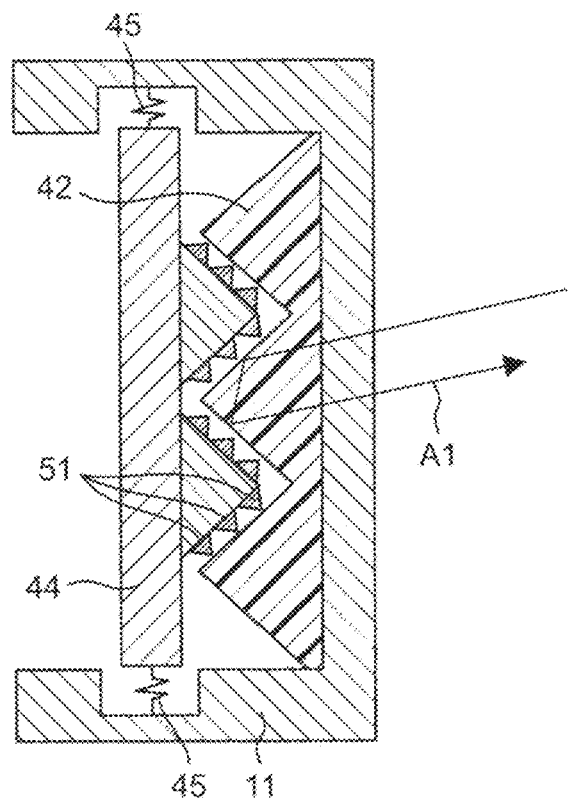
FIG. 14A is a schematic configuration diagram of a vibration visualization element according to a modification.
Figure 14B:
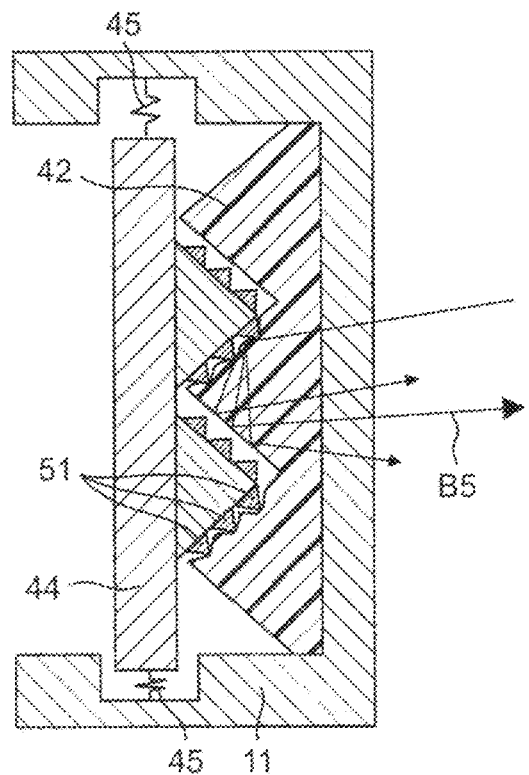
FIG. 14B is a schematic configuration diagram of the vibration visualization element according to the modification.

Although the deformation member 43 of each optical member is integrated with a plate-like shape in the fourth embodiment, the present disclosure is not limited to this. It is sufficient that the deformation member be able to deform part of the corner cube 42 according to the vibration of the vibration visualization element 1, and to deviate the reflection direction of reflected light or electromagnetic wave from the retroreflection direction. For instance, the deformation member may be a projection portion 51 that projects from the surface of the weight 44 to the corner cube 42 side as illustrated in FIG. 14A and FIG. 14B. The projection portion 51 comes into contact with and deforms part of the corner cube 42 according to the vibration of the vibration visualization element 1, and thus the same effect as in the fourth embodiment can be obtained. In the case where the deformation member is the projection portion 51 as illustrated in FIG. 14A and FIG. 14B, it is possible to form depression and projection on a face of the corner cube 42 and to disperse the reflected light. It is to be noted that in a resting state where the vibration visualization element 1 does not vibrate, the projection portion 51 may be in contact with or may be in non-contact with the corner cube 42.

EXAMPLE

Figure 15:
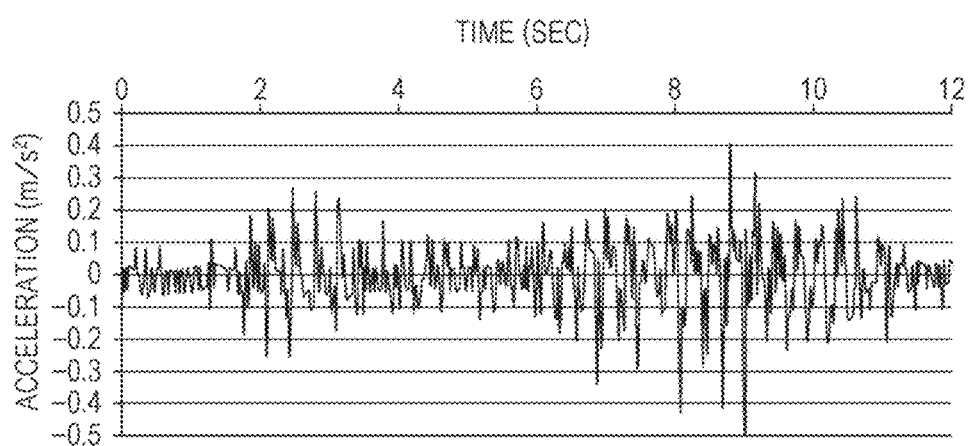
FIG. 15 is a graph illustrating the vibration acceleration of a bridge according to an embodiment.
Figure 16:
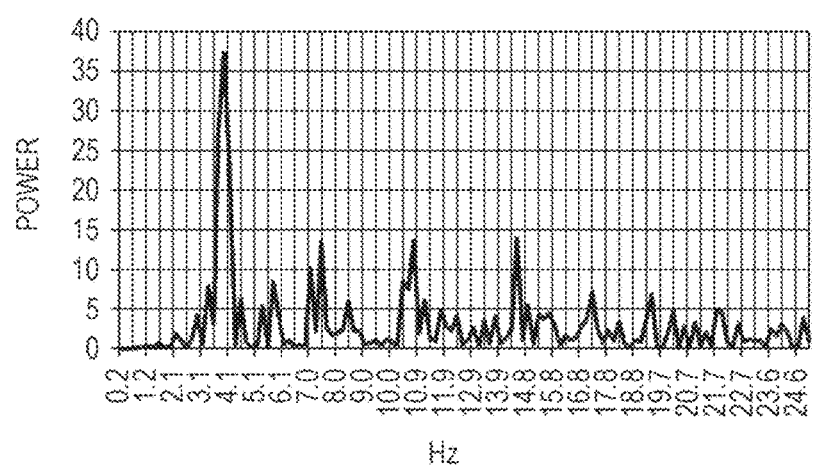
FIG. 16 is a graph illustrating a result of frequency analysis of the vibration acceleration of the bridge according to the embodiment.

FIG. 15 is a graph illustrating an acceleration in the Z direction measured by an acceleration sensor on the bridge girder of a highway bridge in full length of 560 m. FIG. 16 is a graph illustrating the frequency of the vibration acceleration. As illustrated in FIG. 15, the acceleration is in a range of ±0.5 m/s$^2$ or less. As illustrated in FIG. 16, the frequency has the main peak at 3.9 Hz. Based on these data, the vibration visualization element was produced so that when the acceleration is 0.5 m/s$^2$, the angle of the movable mirror with respect to the fixed mirror is displaced by 1° from the right angle. More specifically, the vibration visualization element was produced as follows.

The optical member included in the vibration visualization element was produced such that a stainless steel foil with a thickness of 15 microns was cut by laser machining, and a fixed mirror, a movable mirror, and a spring are thereby cut out, and using a metal mold, two fixed mirrors and a movable mirror were bent so as to be perpendicular to each other.

The fixed mirror has 900 μm per side, and the movable mirror has 800 μm per side. The natural frequency of the movable mirror is approximately 30 Hz, and the intensity of the spring was adjusted so that when an acceleration of 0.5 m/s$^2$ is given at 4 Hz, the movable mirror is moved by approximately 1°. Adjustment of the intensity of the spring was made by checking the vibration characteristic of the movable mirror using a vibration generator while trimming was performed on the length and width of the spring by laser.

Thus produced plural optical members were arranged without space, and a case made of acrylic resin produced by cutting was bonded to the back surface of the fixed mirror of each optical member, thereby producing a vibration visualization element with approximately 10 cm per side. A plurality of the vibration visualization elements were produced and attached to the lateral side of the bridge girder of the highway bridge mentioned above.

Subsequently, video capture was made by an imaging device at night while light being emitted from a light source from a riverside approximately 50 m away from the bridge girder. As the imaging device, a digital camera model capable of Hi-Vision video capturing at 120 Hz was used. As the light source, an LED video light attached to the digital camera was used.

Subsequently, vibration of the bridge girder was measured by a vibration measurement device based on the video captured by the digital camera. The vibration measurement device was implemented by a software installed in a personal computer.

Also, when the LED video light was blinked at the start of video capture by the digital camera, it was verified that the vibration visualization element blinked simultaneously. Thus, the position of the vibration visualization element was identified.

Subsequently, the LED video light was on constantly and images were captured by the digital camera. Based on the captured images, it was clearly verified that the vibration visualization element blinks when an automobile passes through the bridge. Also, the luminance of a pixel area corresponding to the vibration visualization element at the identified position is counted for each frame by an image analysis software separately programmed, and the luminance signal of each vibration visualization element was extracted. Then, the luminance signal indicated that same change as in the absolute value of the acceleration of FIG. 15. The main peak of frequency was 7.8 Hz. Since the luminance signal is proportional to the absolute value of the acceleration, the frequency was doubled. Therefore, it was verified that the peak frequency corresponds to the natural frequency 3.9 Hz of the bridge, and it has been verified that the natural frequency of the structure can be detected. It s to be noted that vibration measurement was possible in the same manner even with changed angle and distance for image capture.

In this manner, it has been verified that vibration measurement can be made from a remote place by attaching the vibration visualization element according to the present disclosure to a measurement object.

It is to be noted that any embodiments out of the various embodiments described above may be combined as appropriate, thereby providing the respective effects of the embodiments.

In the present disclosure, several embodiments have been sufficiently described with reference to the accompanying drawings, and various modifications and alterations will be apparent to those skilled in the art. It should be understood that such modifications and alterations are within the scope of the appended claims as long as the modifications and alterations do not depart from the scope of the present disclosure. Although one or more springs 15, 24, 35 and 45 have been presented as examples of the elastic member in the embodiments and modifications described above, the elastic member is not limited to a spring and may not be a spring. The elastic member may be, for instance, rubber.

The present disclosure makes it possible to measure the vibration of the entire measurement object in a shorter time and to reduce the number of times of maintenance, and thus is useful for not only a public structure such as a bridge or a tunnel, but also for evaluation, monitoring of soundness of a machine, a building or the like. In addition, when the size of the vibration visualization element is increased, it is possible to measure the vibration of the entire measurement object from an airplane or a satellite, and the present disclosure is also applicable to measurement, monitoring of an earthquake.

What is claimed is:

1. A vibration visualization element comprising an optical member that retroreflects light or electromagnetic wave in a static state, the optical member including:
    a fixed section, relative positional relationship of which with respect to a measurement object is fixed; and
    a movable section movably supported by the fixed section to allow relative positional relationship with the fixed section to be changed by application of an acceleration to the fixed section in a predetermined direction, wherein
    the fixed section and the movable section are configured such that, according to the change in the relative positional relationship between the fixed section and the movable section, a reflection direction of the light or the electromagnetic wave is changed to change a luminance of reflected light in a retroreflection direction or an amount of reflected electromagnetic wave in the retroreflection direction.

2. The vibration visualization element according to claim 1,
wherein the optical member includes a first mirror, a second mirror, and a third mirror having specular surfaces perpendicular to each other,
the first mirror is included in the fixed section,
the second mirror is included in the movable section, and
the first and second mirrors are configured to allow an angle of the second mirror with respect to the first mirror to be changed by the application of the acceleration to the fixed section in the predetermined direction.

3. The vibration visualization element according to claim 2,
wherein the optical member further includes an elastic member, and
the second mirror is connected to the fixed section via the elastic member.

4. The vibration visualization element according to claim 2,
wherein the optical member includes an elastic member,
the fixed section includes a shaft, and
the second mirror is supported by the shaft as a center to turn, and is connected to the fixed section via the elastic member.

5. The vibration visualization element according to claim 2,
wherein the optical member includes a weight and an elastic member,
the second mirror includes a plurality of fourth parallel mirrors having specular surfaces parallel to each other,
the fixed section includes a plurality of shafts, and
each of the fourth mirrors is supported by a corresponding one of the shafts as a center to turn, and is connected to the fixed section via the weight and the elastic member in common.

6. The vibration visualization element according to claim 2,
wherein the optical member retroreflects the light or the electromagnetic wave in a range of a predetermined dispersion angle, and
a range of variation in the angle of the second mirror with respect to the first mirror is smaller than the dispersion angle.

7. The vibration visualization element according to claim 1,
wherein the optical member includes a spherical lens and a concave reflector positioned behind the spherical lens,
one selected from the group consisting of the spherical lens and the concave reflector is included in the fixed section,
the other selected from the group is included in the movable section, and
the other selected from the group is supported by the fixed section to allow relative positional relationship with the one selected from the group to be changed by application of an acceleration to the fixed section in a predetermined direction.

8. The vibration visualization element according to claim 7,
wherein the optical member includes an elastic member,
the spherical lens is one of a plurality of spherical lenses connected each other,
the concave reflector is one of a plurality of concave reflectors each positioned behind corresponding one of the spherical lenses,
the concave reflectors are included in the fixed section,
the spherical lenses are included in the movable section, and
the spherical lenses are connected to the fixed section via the elastic member.

9. The vibration visualization element according to claim 1,
wherein the optical member includes a corner cube having three reflection surfaces perpendicular to each other, and a deformation member in contact with the corner cube,
at least part of the corner cube is included in the fixed section,
the deformation member is included in the movable section, and
the deformation member is supported by the fixed section to cause at least one of the three reflection surfaces of the corner cube to be deformed by application of an acceleration to the fixed section in a predetermined direction.

10. A vibration measurement system comprising:
a first vibration visualization element and a second vibration visualization element that are fixed to a measurement object,
a light source that emits light or electromagnetic wave to the first vibration visualization element and the second vibration visualization element, and
an imaging device that captures an image including the measurement object, the first vibration visualization element and the second vibration visualization element,
wherein:
each of the first and second vibration visualization elements comprises an optical member that retroreflects the light or the electromagnetic wave in a static state,
the optical member including:
a fixed section, relative positional relationship of which with respect to the measurement object is fixed; and
a movable section movably supported by the fixed section to allow relative positional relationship with the fixed section to be changed by application of an acceleration to the fixed section in a predetermined direction, and
the fixed section and the movable section are configured such that, according to the change in the relative positional relationship between the fixed section and the movable section, a reflection direction of the light or the electromagnetic wave is changed to change a luminance of reflected light in a retroreflection direction or an amount of reflected electromagnetic wave in the retroreflection direction.

11. The vibration measurement system according to claim 10, further comprising a vibration measurement device that measures change in the relative positional relationship between the fixed section and the movable section in each of the first vibration visualization element and the second vibration visualization element, based on change in the luminance of the reflected light or the amount of the reflected electromagnetic wave from each of the first vibration visualization element and the second vibration visualization element in the image captured by the imaging device.

12. The vibration measurement system according to claim 10,
wherein a natural frequency of the movable section of the first vibration visualization element is different from a natural frequency of the movable section of the second vibration visualization element.

13. The vibration measurement system according to claim 10,
wherein a vibration direction of the movable section of the first vibration visualization element is different from a vibration direction of the movable section of the second vibration visualization element in a state where the vibration visualization elements are fixed to the measurement object.

14. The vibration measurement system according to claim 12, further comprising
first and second color filters with different transmission wavelength bands,
wherein the first color filter is disposed at least on an optical path of the light or the electromagnetic wave incident on the first vibration visualization element, or on an optical path of the reflected light or the reflected electromagnetic wave emitted from the first vibration visualization element, and
the second color filter is disposed at least on an optical path of the light or the electromagnetic wave incident on the second vibration visualization element, or on an optical path of the reflected light or the reflected electromagnetic wave emitted from the first vibration visualization element.

15. The vibration measurement system according to claim 13, further comprising
first and second color filters with different transmission wavelength bands,
wherein the first color filter is disposed at least on an optical path of the light or the electromagnetic wave incident on the first vibration visualization element, or on an optical path of the reflected light or the reflected electromagnetic wave emitted from the first vibration visualization element, and
the second color filter is disposed at least on an optical path of the light or the electromagnetic wave incident on the second vibration visualization element, or on an optical path of the reflected light or the reflected electromagnetic wave emitted from the first vibration visualization element.

16. The vibration measurement system according to claim 11,
wherein the light source intermittently emits light or electromagnetic wave to the first vibration visualization element and the second vibration visualization element, and
the vibration measurement device identifies a position of the vibration visualization element in the image by detecting a portion in the image, the portion changing in synchronization with the intermittent emission of the light source.

17. The vibration measurement system according to claim 10,
wherein the light source has an irradiation angle which allows the first vibration visualization element and the second vibration visualization element to be irradiated.

18. A vibration measurement method using a vibration visualization element fixed to a measurement object, wherein:
the vibration visualization element retroreflects light or electromagnetic wave in a static state, and changes a reflection direction of the light or the electromagnetic wave to change a luminance of reflected light in a retroreflection direction or an amount of reflected electromagnetic wave in the retroreflection direction due to application of an acceleration to the visualization element in a predetermined direction, and
the method comprises:
emitting the light or the electromagnetic wave to the vibration visualization element;
capturing an image including the measurement object and the vibration visualization element; and
measuring vibration of the measurement object based on the change in a luminance of the reflected light or an amount of the reflected electromagnetic wave from the vibration visualization element in the image.

* * * * *